(12) United States Patent
Rossi et al.

(10) Patent No.: US 7,574,875 B2
(45) Date of Patent: Aug. 18, 2009

(54) METHOD FOR VAPOUR DEPOSITION ON AN ELONGATED SUBSTRATE

(75) Inventors: Alessandro Rossi, Baronissi (IT); Franco Cocchini, Cava Dei Tirreni (IT); Stefano Grieco, Giffoni Valle Piana (IT)

(73) Assignee: Fibre Ottiche Sud - F.O.S. S.p.A., Battipaglia (SA) (IT)

( * ) Notice: Subject to any disclaimer, the term of this patent is extended or adjusted under 35 U.S.C. 154(b) by 293 days.

(21) Appl. No.: 10/108,364

(22) Filed: Mar. 29, 2002

(65) Prior Publication Data

US 2002/0194880 A1    Dec. 26, 2002

Related U.S. Application Data

(63) Continuation of application No. PCT/EP00/09358, filed on Sep. 26, 2000.

(60) Provisional application No. 60/156,967, filed on Oct. 1, 1999.

(30) Foreign Application Priority Data

Sep. 29, 1999    (EP) ................................. 99119320

(51) Int. Cl.
*C03B 37/018*    (2006.01)
(52) U.S. Cl. ............................... 65/413; 65/421; 65/520
(58) Field of Classification Search .................. 65/377, 65/483, 516, 517, 520, 524, 421, 413–414, 65/276, 278–280; 118/728, 730
See application file for complete search history.

(56) References Cited

U.S. PATENT DOCUMENTS

| 4,310,339 | A | * | 1/1982 | Blankenship | ................ | 65/416 |
| 4,317,667 | A | * | 3/1982 | Spainhour | ....................... | 65/27 |
| 4,599,098 | A | * | 7/1986 | Sarkar | ......................... | 65/421 |

(Continued)

FOREIGN PATENT DOCUMENTS

EP    0 041 397 A1    12/1981

(Continued)

OTHER PUBLICATIONS

Yoshiya, "Device for Producing Base Material for Optical Fiber", Patent Abstracts of Japan, of JP 01242433, (Sep. 27, 1989) (Abstract Only).

(Continued)

*Primary Examiner*—Carlos Lopez
(74) *Attorney, Agent, or Firm*—Finnegan, Henderson, Farabow, Garrett & Dunner, L.L.P.

(57) ABSTRACT

Device and method for chemical deposition on an elongated member of vitreous material in which a rotating gripping member causes a first end portion of the elongated member to rotate. The second end portion of the elongated member is borne by a pair of supporting members which are axially spaced apart (L1) and are capable of permitting angular rotational movement and axial sliding of the second end portion. Each supporting member also applies a radial constraint preventing the second end portion from moving away from the axis of rotation, thus forcing the second portion and the elongated member to lie with a longitudinal axis coaxial with the axis of rotation. Any curvature of the elongated member is corrected and recovered in this way.

14 Claims, 4 Drawing Sheets

U.S. PATENT DOCUMENTS

| | | | | |
|---|---|---|---|---|
| 5,158,589 | A | * | 10/1992 | Curtis et al. .................... 65/57 |
| 5,203,897 | A | | 4/1993 | Powers et al. |
| 5,221,306 | A | * | 6/1993 | Fleming et al. .............. 65/391 |
| 2003/0005726 | A1 | * | 1/2003 | Takei et al. ................... 65/377 |
| 2003/0221624 | A1 | * | 12/2003 | Jurgensen et al. ........... 118/725 |
| 2004/0055339 | A1 | * | 3/2004 | Ishihara ....................... 65/414 |
| 2004/0060326 | A1 | * | 4/2004 | Ishihara ....................... 65/414 |
| 2005/0072193 | A1 | * | 4/2005 | Cocchini et al. .............. 65/421 |

FOREIGN PATENT DOCUMENTS

| | | | |
|---|---|---|---|
| EP | 0 367 871 A1 | | 5/1990 |
| EP | 482348 A2 | * | 4/1992 |
| EP | 0 630 866 B1 | | 12/1994 |
| EP | 1256553 A2 | * | 11/2002 |
| JP | 55-010438 | * | 1/1980 |
| JP | 60-005032 | * | 1/1985 |
| JP | 04-160028 | * | 6/1992 |
| JP | 2000-086271 | * | 3/2000 |

OTHER PUBLICATIONS

Yukio, "Apparatus for Producing Optical Fiber Soot", Patent Abstracts of Japan, of JP 06329432, (Nov. 29, 1994) (Abstract Only).

Kazuya, "Production for Preform Rod and its Apparatus", Patent Abstracts of Japan, of JP 07215726, (Aug. 15, 1995) (Abstract Only).

Toshikatsu, "Method for Stretching Optical Fiber Preform", Patent Abstracts of Japan, of JP 07017736, (Jan. 20, 1995) (Abstract Only).

Kazuhiro, "Production of Preform for Optical Fiber", Patent Abstracts of Japan, of JP 09030826, (Feb. 4, 1997) (Abstract Only).

* cited by examiner

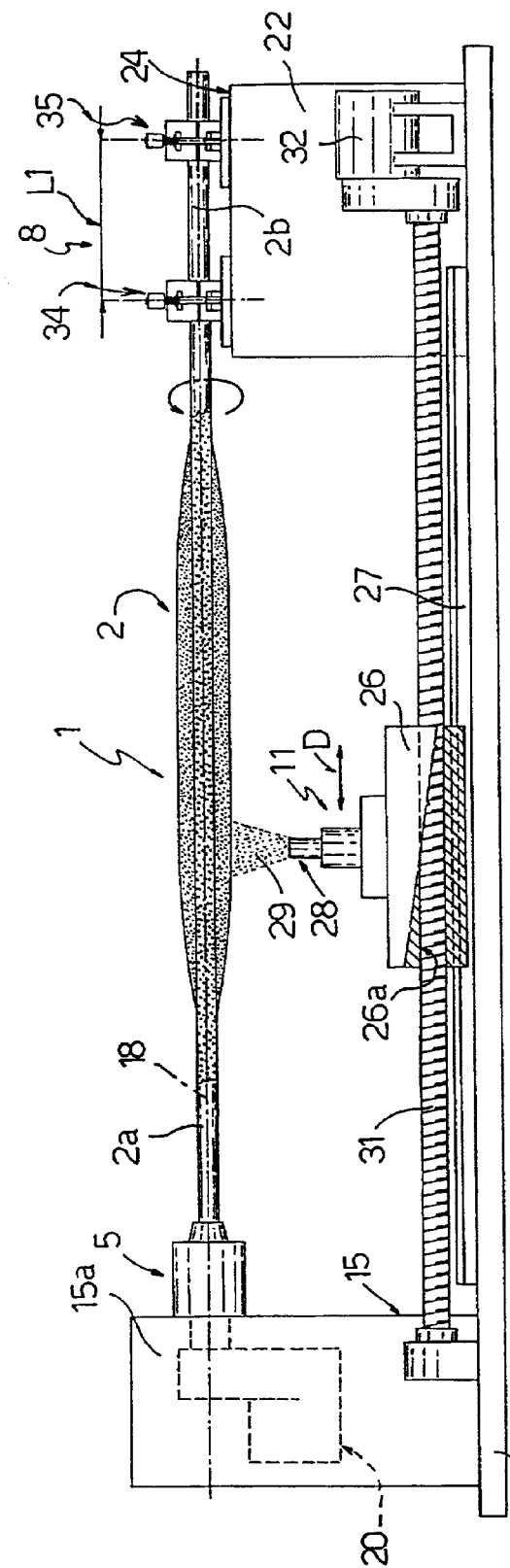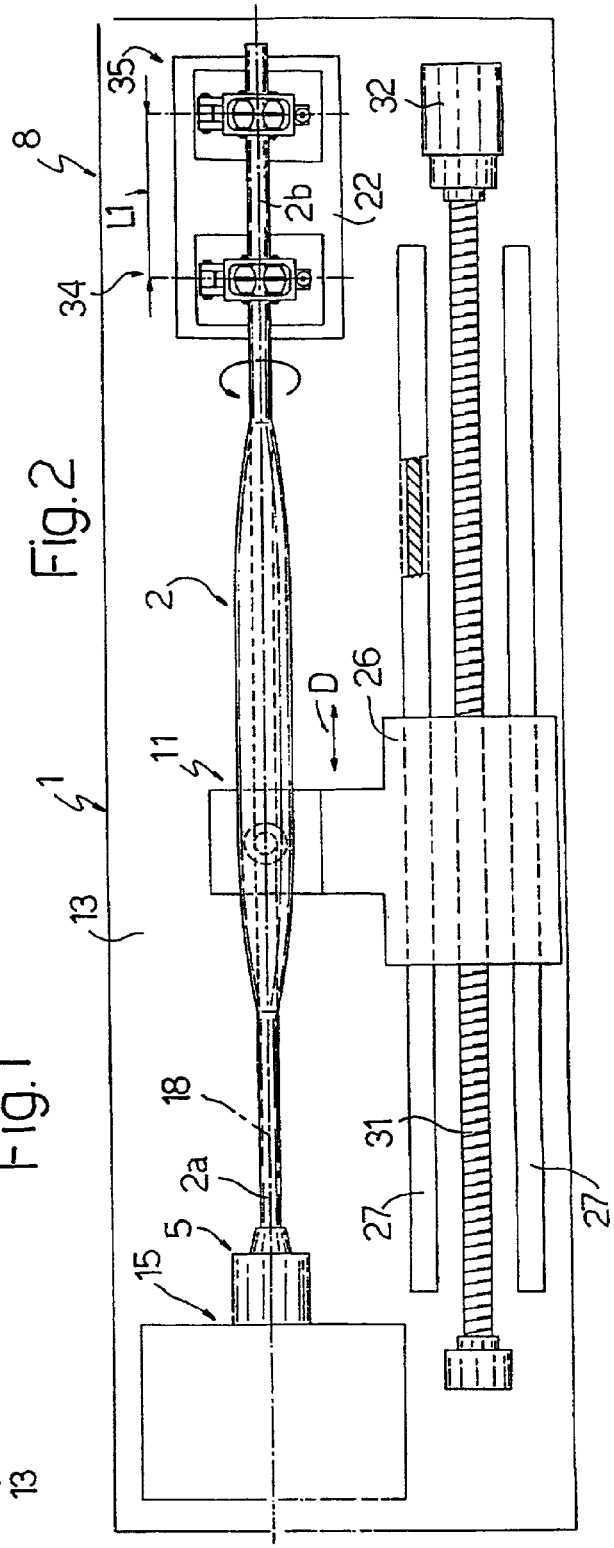

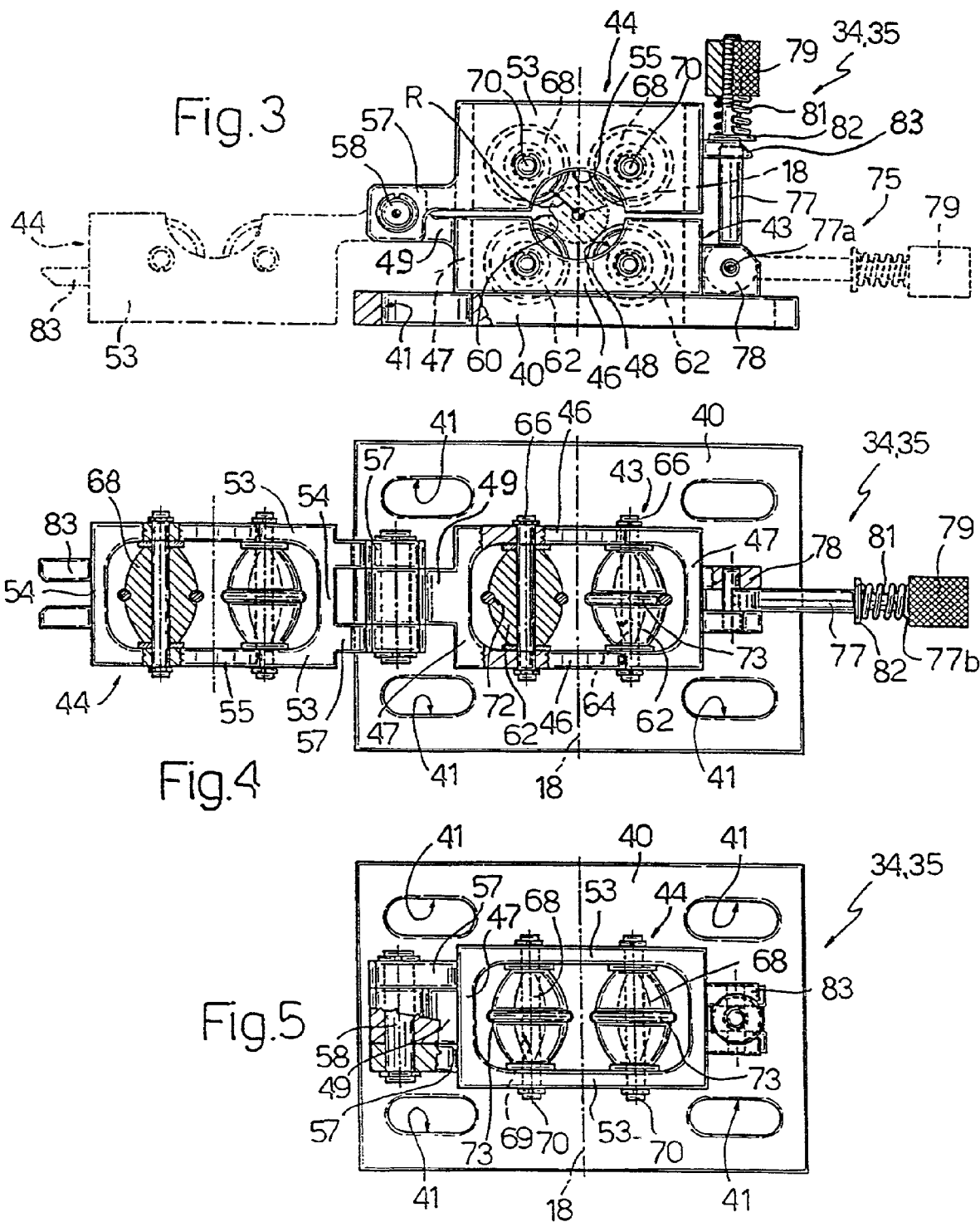

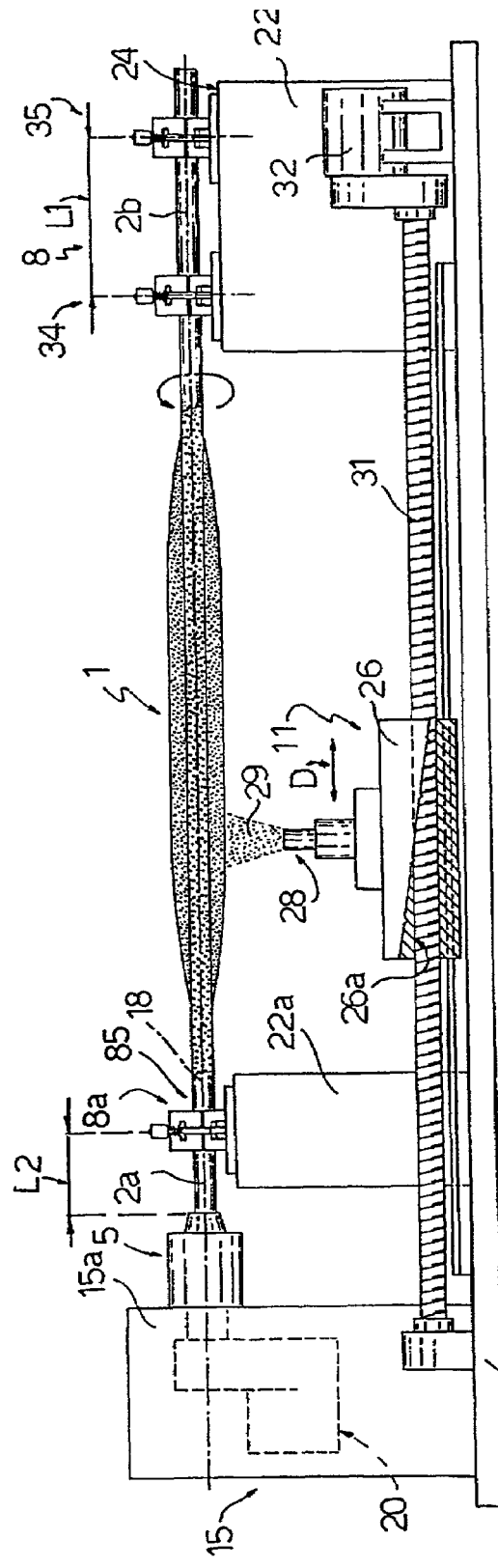
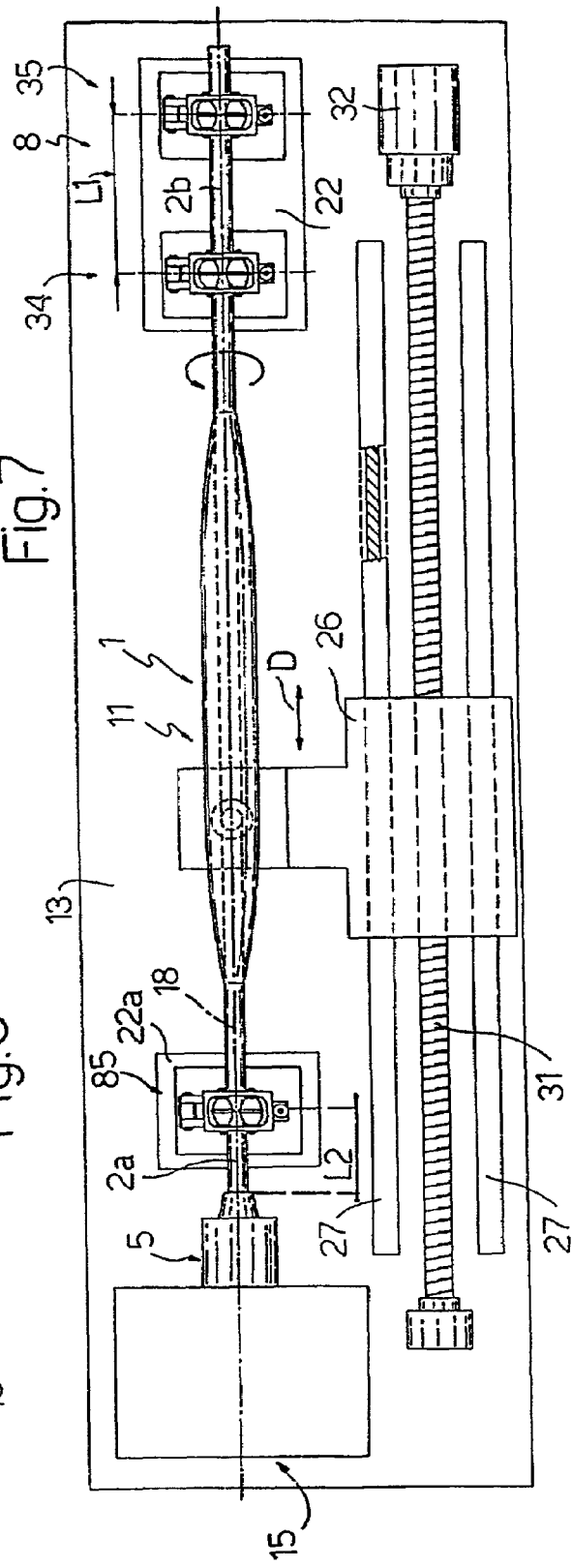

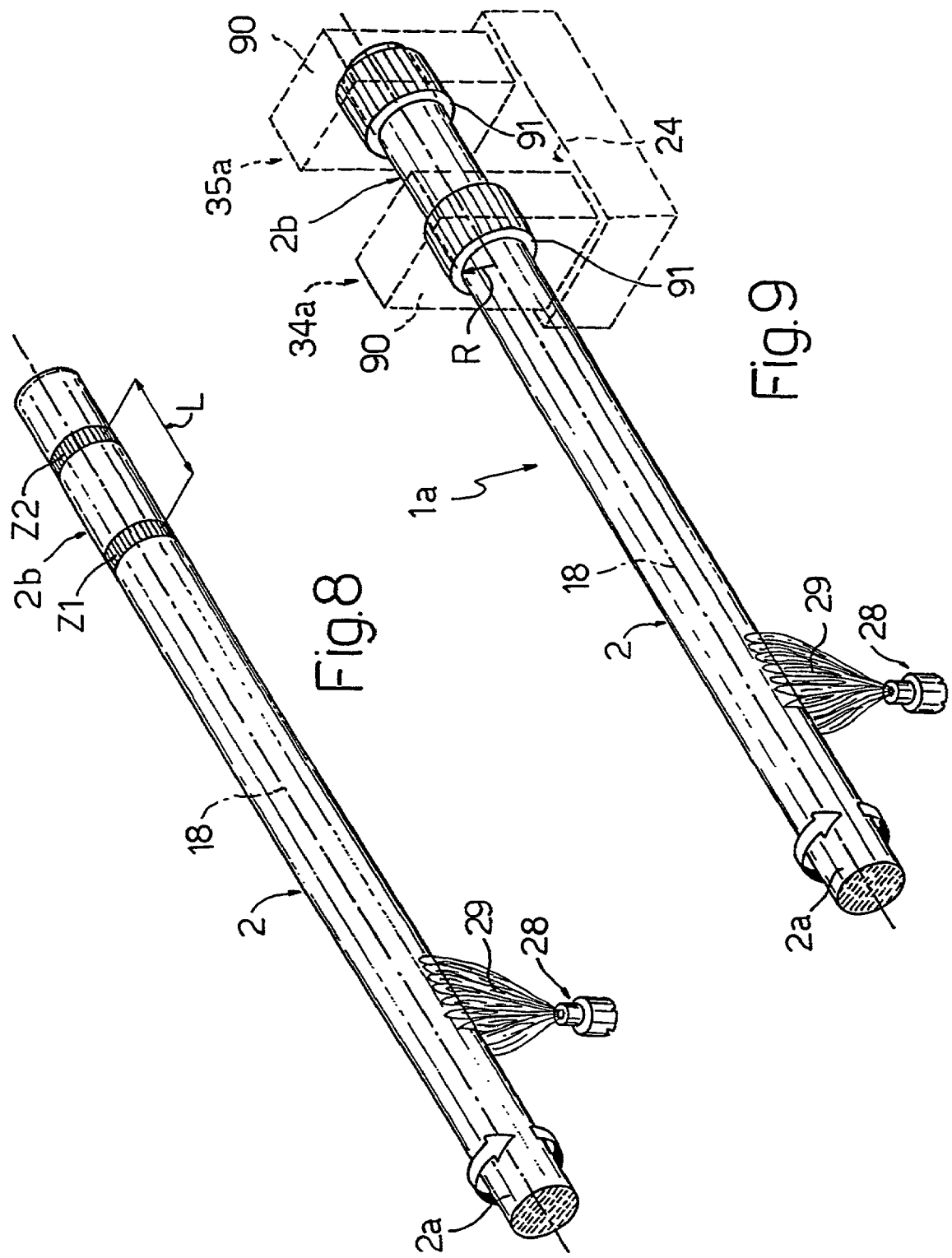

METHOD FOR VAPOUR DEPOSITION ON AN ELONGATED SUBSTRATE

CROSS REFERENCE TO RELATED APPLICATIONS

This application is a continuation of international application number PCT/EP00/09358, filed Sep. 26, 2000, the content of which is incorporated herein by reference, and claims the priority of European Patent Application No. 99119320.2, filed Sep. 29, 1999, and the benefit of U.S. Provisional Application No. 60/156,967, filed Oct. 1, 1999, the content of which are incorporated herein by reference.

BACKGROUND OF THE INVENTION

1. Field of the Invention

This invention relates to a device and method for the chemical deposition of synthetic material on an elongated substrate member.

2. Description of the Related Art

As is well known, an optical fibre is obtained by a process of drawing a preform of vitreous material. In particular the positioning of the preform in a vertical position within a furnace to cause the fusion of a lower part of the said preform is known. The molten material is then drawn downwards by a traction device obtaining a filiform member which forms the optical fibre.

Patent EP 367871 in the name of Corning Glass Works describes a method for obtaining a step index optical fibre with a rapid jump in the refractive index between the core and the cladding. This method initially comprises the step of depositing particles of glass comprising base glass and a refractive-index-increasing dopant onto a mandrel. The mandrel is then removed and the resulting soot preform is consolidated so as to form a core preform having a dopant-deficient surface region. The core preform is stretched and the hole in it is closed to form a core bait rod. Cladding glass soot is then deposited on the core bait rod in a density of at least 0.5 g/cc. This is achieved by directing the flame of the auxiliary burner onto the core bait rod immediately prior to depositing the cladding glass soot upon it. A final preform is thus obtained which is then consolidated and drawn so as to obtain an optical fibre.

A process of the type just described to produce a final preform is commonly known as an OVD (Outside Vapour Deposition) process.

A different method of producing a fibre preform is proposed by EP0041397(A1) in the name of Corning, this method comprising applying particulate material on one end of a starting member to form a coating thereon and longitudinally translating the coating while applying additional particulate material to form a preform body. In this way, the starting member is continuously removed from the preform body leaving a longitudinal aperture in the preform body. Means are provided for supporting, rotating and translating the preform as it is being formed, for example planetary drive wheels.

Again according to patent EP 367871, a traction device comprising a pair of traction driving wheels (indicated by 52 in FIG. 3 of patent EP 367871) which apply a downward traction force to the opposite sides of the said core preform is used to draw out the core preform.

The applicant has noted that, when the latter step is performed, it is possible that, as a result of inaccurate positioning and/or operation of the traction wheels, opposite sides of the core preform are subjected to different forces which cause bending of the core preform during the process of its formation; for this reason core preforms which are not perfectly straight, or which have shape defects, can be produced.

Again in accordance with patent EP 367871, before the cladding glass soot is deposited on the core preform (which at this stage comprises an elongated member of substrate), the core preform is attached at one end to a gripping device (indicated by 56 in FIG. 4 of patent EP 367871) mounted on a lathe. The applicant has noted that, when this step is carried out, core preform positioning errors can occur with the result that the axis of the core preform does not coincide with the intended axis of rotation.

The applicant has noted that the abovementioned positioning errors and the abovementioned shape defects can give rise to a non-negligible straightness error in the core preform during the last step of chemical deposition.

The applicant has therefore noted that these positioning errors and these shape defects can combine to create a non-homogeneous final preform (from which the optical fibre will be drawn), that is a preform having a central portion (defined by the core preform) which is curved and has a non-constant radial distance from the outer surfaces of the said preform; in other words, if a transverse cross section is taken across the preform, it can be seen that the central circular portion corresponding to the cross section of the core preform is not concentric with respect to the corresponding circular cross section of the final preform.

This concentricity error is maintained during the drawing step and the optical fibre produced therefore has a core which is not concentric with respect to the cladding.

The core/clad concentricity therefore provides a measure of how well the core axis is aligned with the cladding axis and is therefore a fundamental parameter for an optical fibre. More particularly, concentricity is defined as the distance between the axis of the core and the cladding. Typically the concentricity should have a small value (e.g. less than 0.5 μm, preferably less than 0.3 μm) so that when two end portions of two different optical fibres are coupled together the attenuation in the transmitted light is small. Optical fibres are in fact typically connected by aligning the outer surfaces of the corresponding claddings and therefore, if the cores are not perfectly located along the axes of the corresponding fibres, coupling between the two cores may be partial, giving rise to a coupling with high losses.

The problem of concentricity is also tackled by EP0630866 (A1) in the name of Corning, which refers to an apparatus and a method for making an optical fiber prefom. This document teaches attaching a rod to an upper cane handle and a lower cane handle to make a cane assembly, and holding the cane assembly with upper and lower cane chucking assemblies. This apparatus is suitable to apply a tensile force along the longitudinal axis to the cane assembly during the deposition of soot thereon.

SUMMARY OF THE INVENTION

The present invention relates to a device and a method which can be used to provide a final preform in an OVD process, in particular which can be used during the step of chemical deposition onto the core preform in order to compensate for any shape defects in the core preform and/or errors in positioning the core preform on the gripping device.

More generally, the means and method according to the invention can be used in any process in which a synthetic material is chemically deposited onto an elongated substrate member, in order to compensate for any shape defects and/or positioning errors in the said elongated member. In the general situation, the elongated substrate member may have a variety of compositions, e.g. may be a member of vitreous material, ceramic material or graphite, and the abovementioned shape errors may have various causes, e.g. may be due to bending of the elongated member caused by gravity after the member has been placed in a horizontal position so that deposition of the synthetic material can be performed.

The device proposed by the applicant includes a rotating gripping member so that a first end portion of the elongated member can be placed in rotation and a pair of supporting members which are axially spaced and adapted to support a second end portion of the elongated member allowing rotational movement and axial sliding of the said second end portion. Each supporting member also provides a radial constraint for the second end portion on the axis of rotation, thus causing the second portion and therefore the elongated member to lie with its longitudinal axis coaxial with the axis of rotation. The applicant is of the opinion that it is possible in this way to limit any rotation of the elongated member in an axial plane (that is in a plane including the axis of rotation) and therefore to correct and recover any curvature in the said elongated member. For the purposes of this invention, by "limiting rotation of the elongated member" is meant applying a radial constraint to the said elongated member which maintains the said elongated member sufficiently straight to reduce the eccentricity of the optical fibre which can be obtained from it to below values which result in an unacceptable PMD.

The device according to the invention therefore makes it possible to construct a homogeneous final preform from which it is possible, through a drawing process, to obtain an optical fibre in which the axis of the core is aligned with the axis of the cladding.

In a first aspect thereof, this invention relates to a method for the chemical deposition of synthetic material on an elongated substrate member having a longitudinal axis, comprising the steps of:

securing one end of the said elongated member in a gripping member, imparting rotation about the said longitudinal axis to the said elongated member through the said gripping member, and depositing synthetic material upon the said elongated member, also comprising the step of radially constraining at least one end of the said elongated member with respect to the said longitudinal axis at two positions axially spaced apart.

Preferably the said steps of securing one end of the said elongated member to a gripping member and radially constraining at least one end of the said elongated member with respect to the said longitudinal axis at two positions axially spaced apart are performed on the opposite ends of the said elongated member.

Alternatively, the said steps of securing one end of the said elongated member to a gripping member and radially constraining at least one end of the said elongated member with respect to the said longitudinal axis at two positions axially spaced apart are performed on the same end of the said elongated member.

The method may further comprise the step of radially constraining each end of the said elongated member with respect to the said longitudinal axis at two positions axially spaced apart.

In accordance with a further aspect, this invention relates to a device for the chemical deposition of synthetic material on an elongated substrate member comprising: a rotating motor-driven gripping member which can be coupled to a first end portion of the elongated member; a supporting device capable of supporting a second end portion of the said elongated member; and a burner device; the said elongated member being capable of moving in rotation about an axis of rotation extending between the said rotating gripping member and the said supporting device, in which the said supporting device comprises: a first supporting member which can be coupled to the said second end portion to permit rotational movement and axial sliding of the second end portion with respect to the first supporting member, the said first supporting member also providing a radial constraint for the second end portion on the said axis of rotation; a second supporting member which can be coupled to the said second end portion to permit rotational movement and axial sliding of the second end portion with respect to the second supporting member, the said second supporting member also providing a radial constraint for the second end portion on the said axis of rotation; the said first supporting member and the said second supporting member being spaced apart along the said axis of rotation.

Preferably, the first supporting member and the said second supporting member each comprise a supporting enclosure and a plurality of rotating members which are borne by the supporting enclosure and which can move in rotation with respect to the supporting enclosure about corresponding axes parallel to the said axis of rotation, the said rotating members permitting the said angular rotational movement of the said elongated member and jointly providing the said radial constraint.

In accordance with a first embodiment, each rotating member is of an ellipsoidal shape.

In accordance with an alternative embodiment to the first one, each rotating member is of spherical shape.

Preferably the device according to the invention comprises an auxiliary supporting member which can be coupled to the said first end portion to permit rotational movement and axial sliding of the first end portion with respect to the auxiliary supporting member; the said auxiliary supporting member also providing a radial constraint for the first end portion on the said axis of rotation; the said auxiliary supporting member and the said rotating gripping member being spaced apart along the said axis of rotation.

BRIEF DESCRIPTION OF THE DRAWINGS

Further details may be found in the following description which refers to the appended figures listed here:

FIG. 1 illustrates a device for chemical deposition onto an elongated member of vitreous material provided in accordance with this invention, in a schematically side view, FIG. 2 illustrates the device in FIG. 1, viewed from above, FIG. 3 illustrates a component member of the device in FIG. 1, in a frontal view and on an enlarged scale, FIG. 4 illustrates the member in FIG. 3, viewed from above, FIG. 5 illustrates the component member in FIG. 4 arranged in a different working position, viewed from above, FIG. 6 illustrates a variant of the device in FIG. 1, in side view, FIG. 7 illustrates the variant of FIG. 6, viewed from above, FIG. 8 schematically illustrates the principle of the operation of the device in FIG. 1, and FIG. 9 illustrates a further variant of the device in FIG. 1.

DETAILED DESCRIPTION OF THE INVENTION

An OVD process for providing a preform from which an optical fibre can be drawn briefly comprises the following steps:

I. A first step during which a plurality of chemical substances are deposited, by means of a process of chemical deposition using a burner, onto a straight cylindrical substrate, made e.g. of ceramic material. The substances deposited on the substrate normally comprise silica ($SiO_2$) typically doped with other compounds, such as e.g. germanium oxide ($GeO_2$) which acts as a dopant. The product of this first phase is a cylindrical preform which subsequently forms the core of the optical fibre;

II. A second step in which the straight ceramic substrate is removed from the preform, leaving a central hole in the preform;

III. A third step in which the previously obtained preform is subjected to a process of drying and consolidation in a furnace in order to remove hydroxyl ions (—OH) and atoms of water present in the preform; a vitrified preform which still has a central hole is obtained in this way;

IV. A fourth step in which, after the central hole in the preform has been closed (e.g. with a plug) and vacuum has been created within it, the vitrified preform is placed in a vertical furnace in which fusion of one lower end of the preform is brought about. Fusion of the lower end causes collapse of the walls of the hole as a result of the vacuum created within it. The molten vitreous material which flows by gravity cools, forming a straight cylindrical member of predetermined diameter which is drawn downwards by a traction device. This straight member is then subsequently cooled and cut transversely at several equidistantly spaced points so as to form a plurality of elongated cylindrical members which are also known by the term "cane";

V. A fifth step in which each elongated member is subjected to a process of chemical deposition using a burner to deposit a plurality of chemical substances which subsequently form the cladding of the optical fibre onto the elongated member. Typically, a substance used to produce the cladding is silica ($SiO_2$). The product of the fifth step is a final low density cylindrical preform. The fifth step can be carried out by means of a device generically comprising a motor-driven rotating gripping member (mandrel) which can be coupled to a first end portion of the elongated cylindrical member, a unit for supporting the second end portion of the elongated cylindrical member acting at a single point on that portion and a burner device which can move between the rotating gripping member and the supporting device; and VI. A sixth step in which the final low density preform is dried and consolidated using the same procedures envisaged for the second step. In this way a final vitrified preform is obtained which is subsequently subjected to a drawing process similar to the process described in the fourth step to obtain a filiform member of vitreous material forming the optical fibre.

FIG. 1 indicates, as a whole, a device 1 for chemical deposition onto an elongated member 2 of vitreous material which is suitable for use in the fifth step of the abovementioned process.

Elongated member 2 (cane) is preferably obtained by the fourth step in the OVD process mentioned above; it remains clear however that elongated member 2 can also be obtained by other means and generically comprises an elongated cylindrical body formed of vitreous material, that is a material comprising mainly silica ($SiO_2$) and, in smaller quantity, other substances (dopants) capable of determining the physical properties (e.g. the refractive index) of the vitreous material.

Device 1 comprises a rotating gripping member 5 which can be coupled to a first end portion 2a (of substantially cylindrical shape) of elongated member 2, a supporting device 8 capable of supporting a second end portion 2b of elongated member 2 and a burner device 11 which can move between rotating gripping member 5 and supporting device 8.

The distance between rotating gripping member 5 and supporting device 8 can be adjusted during the step of setting up device 1.

More particularly, device 1 comprises a flat supporting base 13 which bears a first vertical structure 15 from which there extends rotating gripping member 5 close to an upper end 15a thereof. The rotating gripping member 5 can rotate about a horizontal axis of rotation 18 driven by an electric motor 20 (illustrated schematically) housed in first vertical structure 15 and connected to rotating gripping member 5 through a mechanical transmission (not shown). Preferably rotating gripping member 5 comprises a mandrel which can be stably coupled to first end portion 2a. Horizontal axis of rotation 18 extends between rotating member 5 and supporting device 8.

Flat rectangular supporting base 13 bears a second vertical structure 22 placed at a distance from structure 15 and of lesser height than the latter. Second vertical structure 22 is bounded at the top by a flat wall 24 to which supporting device 8 is fixed by means which will be clarified below.

Burner device 11 (of a known type, which is illustrated schematically) comprises a slide 26 from which there extends, towards preform 2, a nozzle 28 (or a plurality of nozzles) which is capable of emitting a flame 29 in order to heat preform 2. More particularly, slide 26 can slide along a straight guide 27 supported by supporting base 13 and is provided with a longitudinal threaded seat 26a coupled to a screw 31 which extends along guide 27 parallel to axis 18. Screw 31 can move in rotation driven by an electric motor 32 in such a way that reversible linear movement of burner device 11 along a straight direction D parallel to axis of rotation 18 can be performed.

Alternatively, burner 11 may be in a fixed position and structures 15 and 22 may move on base 13 (in a manner not illustrated). For example, a screw mechanism similar to that in FIG. 1 can be used to move structures 15 and 22 synchronously in a direction parallel to axis 18.

As is known, burner 11 is capable of emitting a plurality of chemical substances within flame 29 which are deposited on preform 2; one example of a burner suitable for the purpose is described in patent U.S. Pat. No. 5,203,897.

In accordance with this invention, supporting device 8 comprises:

a first supporting member 34 which can be coupled to second end portion 2b of the preform to permit rotational movement and axial sliding of second end portion 2b with respect to first supporting member 34; first supporting member 34 also provides a radial constraint for end portion 2b on axis of rotation 18, and a second supporting member 35 which can be coupled to second end portion 2b to permit rotational movement and axial sliding movement of second end portion 2b with respect to second supporting member 35; second for second end portion 2b on axis of rotation 18.

First and second supporting members 34, 35 are fixed to flat wall 24 and together with rotating gripping member 5 form an apparatus for supporting elongated member 2 rotatably about a substantially straight direction. First and second supporting members 34, 35 radially constrain second end 2b of elongated member 2 with respect to axis 18 at two positions which are axially spaced apart by a predetermined distance L1. The presence of the double radial constraint imposed by first and second supporting members 34, 35 makes it possible to reduce any curvature of the elongated member or, in other words, makes it possible to limit the rotation of said elongated member 2 in an axial plane.

Distance L1 is normally between 1 and 20 cm, in particular it is preferably between 3 and 10 cm. Distance L1 is selected on the basis of the physical characteristics of elongated member 2, in that it depends on:
- the diameter of elongated member 2, and
- the flexural rigidity of elongated member 2 defined as E×I, where E is Young's modulus for the material of member 2 and I is the bending moment of inertia of the cross section of member 2.

In particular, distance L1 increases as the diameter and flexural rigidity of elongated member 2 increase to prevent the forces applied to supporting members 34 or 35 from becoming too large.

Supporting members 34, 35 in the embodiment illustrated also have the same structure. In particular, each supporting element 34, 35 comprises (FIGS. 3-5):
- a rectangular base plate 40 provided with four holes 41 located at the corners of rectangular wall 40 and used to fix plate 40 to wall 24 by means of bolts (not shown),
- a first metal frame 43 which is stably fixed to the rectangular wall of base 40, and
- a second metal frame 44 hinged to first metal frame 43 and located above it in a closed position subsequently defined and illustrated in FIGS. 3 and 5.

In particular, first metal frame 43 has a perimeter which is rectangular in plan and comprises a first pair of flat vertical walls 46 facing each other and extending perpendicular to plate 40 and a second pair of flat walls 47 facing each other, extending perpendicular to plate 40 and integral with walls 46.

Each wall 46 also has a semicircular cut-out 48 in its upper edge whose function will be clarified below.

First frame 43 is also provided with a lateral appendage 49 which extends perpendicular to and is integral with one of walls 47 towards the outside of said frame 43.

Second metal frame 44 has a substantially rectangular perimeter in plan and comprises a first pair of flat vertical walls 53 facing each other and a second pair of flat vertical walls 54 facing each other and integral with walls 53. Each rectangular wall 54 also has a semicircular cut-out 55 whose function will be clarified below.

Second frame 44 is also provided with a pair of appendages 57 which extend perpendicularly from and are integral with one of walls 54 towards the outside of frame 44 and which have end portions hinged to an end portion of appendage 49 by means of a pin 58. Pins 58 of first and second supporting members 34, 35 are also located parallel to axis of rotation 18.

First and second frames 43, 44 can also move between the closed position mentioned (illustrated by solid lines in FIG. 3 and in FIG. 5) and an open position (illustrated in FIG. 3 by dashed lines and in FIG. 4).

In the closed position, the upper edges of first pair of walls 46 and second pair of walls 47 of first frame 43 are parallel to and adjacent to the corresponding upper edges of first pair of walls 53 and second pair of walls 54 of second frame 44, and each semicircular cut-out 48 in first frame 43 defines together with a corresponding semicircular cut-out 55 in second frame 44 a circular opening 60 which is coaxial with axis 18. Opening 60 also has a diameter which is greater than the diameter of second cylindrical end 2b of elongated body 2.

In the open position, first frame 43 and second frame 44 are spaced apart with the upper edges of first pair of walls 46 of first frame 43 forming an obtuse angle with the corresponding edges of first pair of walls 53 of second frame 44.

First frame 43 has a pair of rotating members 62 of preferably ellipsoidal shape mounted between the first pair of walls 46 and forming rotating bodies supporting second end portion 2b; in particular, each rotating member 62 has a through central hole 64 whose axis coincides with the principal axis of said rotating member 62. Through central hole 64 is engaged by a pin 66 which extends parallel to axis 18 and has end portions stably fixed to walls 46.

Similarly, second frame 44 has a pair of rotating members 68 of ellipsoidal shape mounted between the first pair of walls 53 and forming rotating bodies supporting second end portion 2b; in particular, each rotating member 68 has a through central hole 69 whose axis coincides with the principal axis of said rotating member 68. Central through-hole 69 is engaged by a pin 70 which extends parallel to axis 18 and has end portions stably fixed to walls 53. In this way each rotating member 62, 68 can move in rotation with respect to corresponding frame 43, 44 about a corresponding axis of rotation parallel to axis 18.

In accordance with a variant embodiment (not shown) rotating members 62 and 68 are of a shape different from that described above, in particular a spherical shape.

In the closed position mentioned above each of pins 66 and 70 is at a predetermined distance from axis of rotation 18. Rotating members 62 and 68 are preferably of the same shape and the same dimensions so that the minimum radial distance R (shown in FIG. 3) between each rotating member 62 and 68 and axis of rotation 18 is substantially constant.

Rotating members 62 and 68 are preferably constructed of the same material, e.g. a fluororate polymer (Rulon® J or Valflon® F107), with a low dynamic friction coefficient. In particular, corresponding to a preferred operating temperature between 50 and 350° C., the dynamic friction coefficient of the material lies between 0.05 and 0.20 and the elastic modulus lies between 1200 and 3000 N/mm².

Rotating members 62 and 68 are also constructed of a material which is resistant to acids (e.g. hydrochloric acid).

In accordance with a preferred configuration illustrated in FIGS. 3, 4 and 5, each rotating member 62, 64 has an annular groove 72 which extends along the transverse cross section of maximum radial dimension and houses an elastic ring 73, in particular a ring of elastomer material (e.g. a ring constructed using the elastomer materials known by the trade names Viton® and Karlets®) defining the single point of contact between the corresponding rotating member and end portion 2b. Elastic rings 73 may not be present.

Elastic rings 73 project above the surface of rotating member 62, 68, and the minimum radial distance between each elastic ring 73 and axis 18 is substantially constant and a little less than the abovementioned radial distance R.

Each supporting member 34, 35 is also provided with a locking device 75 capable of maintaining metal frames 43 and 44 stably in the said closed position. In particular, locking device 75 comprises an elongated member 77 having a first end portion 77a which is hinged to an appendage 78 extending from wall 40 corresponding to wall 47 opposite that from which appendage 49 extends, and a second end portion 77b from which a knurled cylindrical knob 79 extends axially.

Elongated member 77 has a helicoidal spring 81 coaxially mounted with member 77 and has a first end portion fixed to knob 79 and a second end portion to which a ring 82 fitted coaxially with member 77 is fixed. In the said closed position, ring 82 abuts against a U-shaped member 83 extending from one of walls 54. In this way, metal frames 43 and 44 are stably held in the said closed position when ring 82 is pressed against U-shaped member 83 by spring 81; also, in this position, elongated member 77 engages the seat provided in U-shaped member 83.

To release frames 43, 44 from each other it is sufficient to rotate elongated member 77 towards base wall 40 causing elongated member 77 to exit from U-shaped member 83 while at the same time disconnecting ring 82 from the latter.

In accordance with a first variant illustrated in FIG. 6, the device for chemical composition comprises, in addition to supporting device 8 previously described, an auxiliary supporting device 8a located close to rotating gripping member 5 and capable of supporting first end portion 2a of elongated member 2. Auxiliary supporting device 8a is part of the equipment to support elongated member 2. Auxiliary supporting device 8a and rotating gripping member 5 radially constrain the first end 2a of the elongated member with respect to axis 18 at two positions which are axially spaced apart.

Auxiliary supporting device 8a comprises a vertical structure 22a which bears at the top a supporting member 85 which has a structure similar to that of members 34, 35. In particular, supporting member 85 can be coupled to first end portion 2a to permit angular rotational movement and axial sliding of first end portion 2a with respect to supporting member 85; supporting member 85 also provides a radial constraint for end portion 2a on axis of rotation 18.

Supporting member 85 therefore comprises two metal frames (similar to frames 43, 44 ) which are hinged together and which support rotating members having the same structure and the same function as rotating members 62 and 68.

Distance L2 (measured along axis 18 ) between supporting member 85 and rotating gripping member 5 is normally between 1 and 20 cm; in particular distance L2 is preferably between 3 and 10 cm.

In the same way as was said for distance L1, distance L2 depends on the physical characteristics of elongated member 2.

In use, in order to position elongated member 2, supporting members 34, 35 (and supporting member 85, if present) are placed in the open position to permit elongated member 2 to be housed.

First end portion 2a, having a substantially cylindrical shape, is placed coaxially with axis 18 and stably coupled (in a known way) to rotating gripping member 5.

Second end portion 2b is placed on supporting members 34, 35 coaxial with mandrel 5 (open) and in particular is supported on rotating members 62 of supporting members 34, 35. More particularly, end portion 2b is in contact with elastic rings 73 of rotating members 62.

In this way (FIG. 8), end portion 2b has two annular contact areas Z1, Z2 separated axially by distance L1; each contact area Z1, Z2 is in contact beneath, with elastic rings 73 of rotating members 62 housed in first frame 43 of a corresponding supporting member 34, 35.

Subsequently, second frame 44 of each supporting member 34, 35 (and auxiliary supporting member 85, if present) is caused to rotate manually to the closed position and secured in that position by locking device 75.

In this way, each annular contact area Z1, Z2 acts together with the elastic rings 73 of all rotating members 62, 68 belonging to a corresponding supporting member 34, 35.

If auxiliary support device 8a is also present, a further contact area Z3 (not shown) is defined at the end portion 2a of elongated member 2; when supporting member 85 is in the closed position, contact area Z3 is in contact with the elastic rings of the rotating members of said supporting member 85 both above and below.

When supporting members 34, 35 are in the closed position, end portion 2b passes through openings 60 without touching the edges of the said openings and, having a radius which is substantially equal to the distance R, is radially immobilized by the four rotating members 62, 68 (in particular by corresponding elastic rings 73 ).

The process of deposition is initiated by starting electric motor 20 which places elongated member 2 in rotation and by starting electric motor 32 for alternating linear movement of burner device 11 along direction D. Alternatively, if burner 11 is fixed in position, the process starts with starting of the motor which causes the screw mechanism (not shown) moving structures 15 and 22 to rotate.

During this process, as a result of the temperature created by burner device 11, the substances emitted by said burner device 11 react together and the reaction products are deposited on the outer surface of elongated cylindrical member 2. The simultaneous rotation of cylindrical member 2 and translational movement of burner device 11 brings about substantially uniform deposition of the substances ($SiO_2$ and any dopants) on elongated member 2.

During the abovementioned deposition process each supporting member 34, 35 permits:

free rotation of end portion 2b with respect to supporting member 34, 35 in that rotating members 62 and 68, to which the rotary motion of end portion 2b is transmitted, are free to rotate about their own axes, and axial sliding of end portion 2b with respect to a corresponding supporting member 34, 35 in that the axial movements of portion 2b with respect to supporting member 8 are mediated by contact with a corresponding ring 73 and the surface of end portion 2b, this contact defining a spiral track during this axial displacement as a result of the rotation of elongated member 2.

Axial sliding of end portion 2b may for example take place during the progressive heating of elongated member 2 after burner device 11 has been lit.

If there are no elastic rings 73, end portion 2b is in direct contact with the surfaces of rotating members 62, 68 and axial sliding takes place as a result of the low dynamic friction coefficient of said rotating members 62, 68.

Similar considerations apply to end portion 2a if supporting member 85 is present.

Elastic rings 73 are also in contact with contact areas Z1, Z2, thus forming a radial constraint which causes portion 2b to lie with its longitudinal axis coaxial with axis 18. In this way contact areas Z1 and Z2 are prevented from moving away from axis of rotation 18.

In this way the rotation of elongated member 2 in an axial plane is limited and any alignment errors in elongated member 2 due to errors in the positioning of end portion 2a on rotating gripping member 5 and/or due to shape defects (curved elongated member) introduced e.g. during the fourth step of the OVD process are corrected.

Portion 2b is in fact forced to remain coaxial with axis of rotation 18 by the pair of supporting members 34, 35 which apply the abovementioned radial constraint to portion 2b in such a way that portion 2b extends perfectly straight along the section of length L1 lying between pair of supporting members 34, 35. The straightness constraint is also imposed upon the remaining part of elongated member 2 which extends between supporting device 8 and rotating gripping member 5.

An additional corrective effect on end portion 2a is achieved when auxiliary supporting member 85 is present. The auxiliary supporting member in fact causes first end portion 2a to remain perfectly coaxial with axis of rotation 18.

The process of deposition is therefore performed on an elongated member which is made substantially straight and whose longitudinal axis coincides with the axis of rotation; in this way a final preform which is substantially free from shape defects, that is a preform having a central portion (corresponding to the cane) which is straight and has a constant radial distance with respect to the outer surfaces of the preform such as to provide a concentricity of less than 0.3 in the optical fibres obtained from it, is produced. In other words, if a transverse cross section is taken across the preform, it will be seen that the circular central portion corresponding to the cross section of the cylindrical cane is concentric with respect to the circular cross section corresponding to the cross section of the final preform.

When this preform is subjected to a drawing process, an optical fibre having a core which is concentric with the cladding is obtained.

The process of deposition is continued until a preform of predetermined dimensions which is ready to be subjected to further processing steps, in particular a drying step and a consolidation step of a known type, is obtained.

When the deposition process is complete, motors 20 and 32 are switched off and supporting members 34, 35 (and auxiliary supporting member 85, if present) are opened in order to permit the preform to be removed. Rotating gripping member 5 and first end portion 2a are also disconnected.

With particular reference to FIG. 9, a device 1a which differs from device 1 previously described in the structure of supporting members 34, 35 is illustrated. In the following description, identical parts will be indicated by the same numbers as were previously used while different parts will be indicated by new members. In particular, device 1a comprises, in the same way as described for device 1, a pair of supporting members 34a, 35a which are axially spaced apart along axis of rotation 18 and are capable of supporting different parts of second end portion 2b of elongated member 2.

In particular, each supporting member 34a, 35a comprises a metal supporting enclosure 90 which houses a tubular bush 91 which is fixedly mounted with respect to supporting enclosure 90 and coaxial with axis of rotation 18. Supporting enclosures 90 are arranged and stably fixed to opposing end portions of wall 24 so as to provide the abovementioned axial spacing between supporting members 34a, 35a.

Tubular bush 91 has an internal radius R which is substantially equal to the radius of cylindrical portion 2b so that a radial constraint is applied to portion 2b when it is inserted within said bush 91. Bush 91 is constructed of a material having a low dynamic friction coefficient so as to permit both rotation and axial displacement of end portion 2b with respect to bush 91. In particular, bush 91 has a dynamic friction coefficient which preferably lies between 0.05 and 0.20 at an operating temperature lying between 50 and 300° C., and an elastic modulus which preferably lies between 1200 and 3000 N/mm$^2$.

When auxiliary supporting member 85 is present, this may have the same structure as a supporting member 34a, 35a.

When in use, the elongated body is arranged coaxially with axis of rotation 18 and inserted into bushes 91 of supporting members 34a, 35a so that end portion 2b is located between supporting members 34a, 35a which apply the abovementioned radial constraint to axially spaced areas of end portion 2b. First end portion 2a is connected to the rotating gripping member and the operations of chemical deposition previously described are repeated.

As described in the case of device 1, end portion 2b is forced by pair of bushes 91 to lie with its own axis coaxial with axis of rotation 18. In fact, bushes 91 apply the abovementioned radial constraint to portion 2b in such a way that portion 2b is perfectly straight over the section of length L1 which extends between the pair of supporting members 34a, 35a. The straightening constraint is also imposed on the remaining part of elongated member 2 which extends between supporting device 8 and rotating gripping member 5.

In this case too, the presence of an auxiliary supporting member 85 makes further correction of the straightness of elongated member 2 possible.

Device 1 may also advantageously be used to carry out the first step of the OVD process. In this case, as the straight member is substantially free of shape defects, the abovementioned straightness problems are of lesser extent.

The members supporting elongated member 2 may be constructed in different ways, e.g. they may comprise one or more elongated sleeves (one of which might replace a pair of supporting members of the type described previously) or other technically similar devices suitable for use in the manner previously described to limit the rotation of elongated member 2 in an axial plane.

The results of experimental measurements are described below. In order to carry out these measurements the applicant provided a first group of ten elongated members (canes) C1-C10 manufactured in accordance with steps I-IV of the OVD process previously described. Elongated members (canes) C1-C10 manufactured in this way were 1130 mm long and had a diameter of 10.1 mm.

Elongated members C1-C10 were not perfectly straight and, when placed on a device for performing a chemical deposition process, had a longitudinal axis which was locally displaced from the previously defined axis of rotation by a distance which was not negligible. The term offset will subsequently be used to indicate this distance.

Appended Table 1 shows the experimental data obtained for the first group of elongated members C1-C10; these experimental data comprise measurement of the maximum offset from the axis of rotation of the axis of each elongated member and the mean value and standard deviation for the maximum offsets.

TABLE 1

| Elongated member | Maximum offset (mm) |
| --- | --- |
| C1 | 0.22 |
| C2 | 0.23 |
| C3 | 0.26 |
| C4 | 0.30 |
| C5 | 0.33 |
| C6 | 0.34 |
| C7 | 0.44 |
| C8 | 0.61 |
| C9 | 0.71 |
| C10 | 0.80 |
| Mean | 0.42 |
| Standard deviation | 0.21 |

The applicant also provided a second group of ten elongated members (canes) C11-C20 manufactured in the same way as members C1-C10. Elongated members (canes) C11-C20 manufactured in this way were 1130 mm long and had a diameter of 10.1 mm.

Appended Table 2 shows experimental data obtained for the second group of elongated members C11-C20; these experimental data comprise measurements of the maximum offset in the longitudinal axis of each elongated member from the axis of rotation and the mean value and standard deviation for the maximum offsets.

TABLE 2

| Elongated member | Maximum offset (mm) |
|---|---|
| C11 | 0.22 |
| C12 | 0.23 |
| C13 | 0.27 |
| C14 | 0.30 |
| C15 | 0.33 |
| C16 | 0.37 |
| C17 | 0.41 |
| C18 | 0.63 |
| C19 | 0.73 |
| C20 | 0.81 |
| Mean | 0.45 |
| Standard deviation | 0.22 |

The offset was measured using a dedicated device (not shown) in which a first rotating gripping member is capable of supporting a first end of the elongated member and a supporting device is capable of supporting the second end of the elongated member with freedom of rotatory movement. The rotating member is of the motor-driven type and is capable of placing the elongated member in rotation about a substantially horizontal axis of rotation. An optoelectronic device capable of measuring the offset between the longitudinal axis of the elongated member and the axis of rotation while the said elongated member is rotating is also provided. This optoelectronic device comprises a laser source capable of generating a light beam directed transversely towards the elongated member and having a greater diameter than the diameter of the elongated member. The measuring device also comprises an optical sensor located opposite the laser source with respect to the axis of rotation capable of receiving the part of the optical beam which is not intersected by the elongated rotating member; in this way the optical sensor receives an optical signal which is modulated by the position of the elongated member with respect to the axis of rotation and generates an electrical signal which contains information relating to the position of the elongated member with respect to the axis of rotation. After having been processed, the electrical signal provides an instantaneous indication of the offset between the longitudinal axis of the elongated member and the axis of rotation.

To permit measurement of the offset along the entire length of the elongated member, the laser source and the optical sensor can slide synchronously along the axis of rotation. In this way, both the maximum value of the offset and the mean value of the offset can be determined.

First group of elongated members C1-C10 was used to produce a first group of preforms, indicated by P1-P10, using device 1 constructed in accordance with this invention and shown in FIGS. 1 and 2.

Second group of elongated members C11-C20 was used to produce a second group of preforms, indicated by P11-P20, using a device (not shown) which differed from device 1.

This device may e.g. comprise a rotating gripping member similar to member 5 capable of seizing a first end portion $2a$ of elongated member 2 and a supporting device similar to supporting device 8 but without supporting member 34, capable of supporting a second end portion $2b$ of elongated member 2. This device differs from device 1 in that it is capable of supporting each end of elongated member 2 at a single point and can therefore be identified as a single constraint supporting device (for each end of member 2) in order to distinguish it from the double constraint supporting device to which this invention relates.

The applicant decided to use a device of this type in order to make a comparison between the defect correction effect which can be achieved with the device according to the invention and the defect correction effect which can be achieved by constraining each end of the elongated member at a single point.

Preforms P1-P10 and P11-P20 were then subjected to drying and consolidation processes and finally to a drawing process to obtain corresponding groups of optical fibres F1-F10 and F11-F20. In this specific instance, the process was performed in such a way as to construct optical fibres F1-F10 and F1-F20 of the single mode type.

The optical fibres in first group F1-F10 and those in second group F11-F20 were subjected to measurements of concentricity using the "PK 2400" device produced by the Photonkinetics company.

This device can be used to determine the centre of the core and the centre of the optical fibre, and to measure the distance between these centres.

In particular, the "PK 2400" device is capable of shining a laser beam into the first end of the optical fibre under test, detecting an image of the second end of the fibre and identifying on that image both the geometrical centre of the optical fibre and the laser point corresponding to the laser beam leaving the said optical fibre. The "PK 2400" device is also capable of measuring the distance between the laser point and the geometrical centre; this measurement represents the concentricity of the optical fibre at the second end of the fibre.

Tables 3 and 4 below show the maximum concentricity data measured for each of the optical fibres in first group F1-F10 and second group F11-F20 respectively. Mean values of the maximum concentricity and the corresponding standard deviations are also shown.

TABLE 3

| Optical fibre | Maximum offset (μm) |
|---|---|
| F1 | 0.06 |
| F2 | 0.13 |
| F3 | 0.20 |
| F4 | 0.16 |
| F5 | 0.13 |
| F6 | 0.25 |
| F7 | 0.24 |
| F8 | 0.32 |
| F9 | 0.23 |
| F10 | 0.32 |
| Mean | 0.22 |
| Standard deviation | 0.07 |

TABLE 4

| Optical fibre | Maximum offset (μm) |
|---|---|
| F11 | 0.33 |
| F12 | 0.16 |
| F13 | 0.32 |
| F14 | 0.25 |
| F15 | 0.22 |
| F16 | 0.29 |
| F17 | 0.25 |
| F18 | 0.33 |
| F19 | 0.38 |
| F20 | 0.43 |

TABLE 4-continued

| Optical fibre | Maximum offset (μm) |
|---|---|
| Mean | 0.30 |
| Standard deviation | 0.08 |

From an examination of the results shown in Tables 3 and 4 it will be seen that the optical fibres produced by drawing preforms manufactured using a device working in accordance with this invention have a lower concentricity than the optical fibres produced by drawing preforms obtained with a single constraint supporting device.

In particular, the improvements in terms of standard deviation are particularly important as they enable optical fibre producers to guarantee a particularly tight range of variability in concentricity.

The applicant also wished to assess how the deformation of an originally curved elongated member (cane) was corrected when this elongated member was used in the device according to this invention.

Tables 5, 6, 7 and 8 show values for the offset of an elongated member used in a device constructed in accordance with this invention at intervals 100 mm apart along the axis of rotation.

The position at 0 mm corresponds to the position of rotating gripping member 5 and the position 1000 mm corresponds to the position of supporting member 34. In Tables 5, 6, 7 and 8, the distance L1 between first supporting member 34 and second supporting member 35 is 50 mm, 100 mm, 150 mm and 200 mm respectively.

TABLE 5

Distance L1 equal to 50 mm

| Position of gripping member 5 (mm) | Offset (mm) |
|---|---|
| 0 | 0 |
| 100 | −0.03 |
| 200 | −0.10 |
| 300 | −0.19 |
| 400 | −0.27 |
| 500 | −0.30 |
| 600 | −0.27 |
| 700 | −0.20 |
| 800 | −0.12 |
| 900 | −0.04 |
| 1000 | 0 |
| 1050 | 0 |

TABLE 6

Distance L1 equal to 100 mm

| Position of gripping member 5 (mm) | Offset (mm) |
|---|---|
| 0 | 0 |
| 100 | −0.03 |
| 200 | −0.11 |
| 300 | −0.20 |
| 400 | −0.28 |
| 500 | −0.31 |
| 600 | −0.29 |
| 700 | −0.22 |
| 800 | −0.13 |
| 900 | −0.05 |
| 1000 | 0 |
| 1100 | 0 |

TABLE 7

Distance L1 equal to 150 mm

| Position of gripping member 5 (mm) | Offset (mm) |
|---|---|
| 0 | 0 |
| 100 | −0.03 |
| 200 | −0.11 |
| 300 | −0.20 |
| 400 | −0.28 |
| 500 | −0.32 |
| 600 | −0.30 |
| 700 | −0.23 |
| 800 | −0.14 |
| 900 | −0.05 |
| 1000 | 0 |
| 1150 | 0 |

TABLE 8

Distance L1 equal to 200 mm

| Position of gripping member 5 (mm) | Offset (mm) |
|---|---|
| 0 | 0 |
| 100 | −0.03 |
| 200 | −0.11 |
| 300 | −0.21 |
| 400 | −0.29 |
| 500 | −0.33 |
| 600 | −0.31 |
| 700 | −0.24 |
| 800 | −0.15 |
| 900 | −0.06 |
| 1000 | 0 |
| 1200 | 0 |

Table 9 shows the offsets found using a single constraint supporting device (of the type indicated above) supporting each end of the elongated member with a single supporting member.

TABLE 9

| Position of gripping member 5 (mm) | Offset (mm) |
|---|---|
| 0 | 0 |
| 100 | −0.05 |
| 200 | −0.16 |
| 300 | −0.29 |
| 400 | −0.42 |
| 500 | −0.50 |
| 600 | −0.50 |
| 700 | −0.44 |
| 800 | −0.32 |
| 900 | −0.17 |
| 1000 | 0 |

From an examination of the results shown in Tables 5, 6, 7, 8 and 9 it will be seen that the device according to this invention makes possible a substantial reduction in the offset between the elongated member and the axis of rotation.

What is claimed is:

1. A method for the chemical deposition of synthetic material on an elongated substrate member having a longitudinal axis, comprising the steps:
   a) securing one end of said elongated member in a gripping member;
   b) imparting rotation about said longitudinal axis to said elongated member through said gripping member; and
   c) depositing synthetic material on said elongated member, and further comprising the step of radially constraining at least one end of said elongated member with respect to said longitudinal axis at two positions spaced apart along said longitudinal axis by contacting a first radial constraint member to the elongated member at a first of the two positions and contacting a second radial constraint member to the elongated member at a second of the two positions, the first and second radial constraint members each having a proximal end and a distal end with respect to the at least one end of said elongated member, the distal end of the first radial constraint member being adjacent to the proximal end of the second radial constraint member.

2. A method according to claim 1, wherein said steps of securing one end of said elongated member to a gripping member and radially constraining at least one end of said elongated member with respect to said longitudinal axis at two positions axially spaced apart are performed on opposite ends of said elongated member.

3. A method according to claim 1, wherein said steps of securing one end of said elongated member to a gripping member and radially constraining at least one end of said elongated member with respect to said longitudinal axis at two positions axially spaced apart are performed on the same end of said elongated member.

4. A method according to claim 1, further comprising the step of radially constraining each end of said elongated member with respect to said longitudinal axis at two positions axially spaced apart.

5. A method according to claim 1, wherein the core/clad concentricity is less than 0.5 micrometers.

6. A method according to claim 1, wherein the core/clad concentricity is less than 0.3 micrometers.

7. A method for the chemical deposition of synthetic material on an elongated substrate member having a longitudinal axis, comprising the steps:
  a) securing one end of said elongated member in a gripping member;
  b) imparting rotation about said longitudinal axis to said elongated member through said gripping member;
  c) depositing synthetic material on said elongated member; and
  d) radially constraining at least one end of said elongated member with respect to said longitudinal axis at two positions spaced apart along said longitudinal axis and located substantially at the at least one end of said elongated member, a first radial constraint member being placed at a first of the two positions and a second radial constraint member being placed at a second of the two positions, the first radial constraint member and the second radial constraint member maintaining contact with the elongated member, the first and second radial constraint members each having a proximal end and a distal end with respect to the at least one end of said elongated member, the distal end of the first radial constraint member being adjacent to the proximal end of the second radial constraint member.

8. A method according to claim 7, wherein said steps of securing one end of said elongated member to a gripping member and radially constraining at least one end of said elongated member with respect to said longitudinal axis at two positions axially spaced apart are performed on opposite ends of said elongated member.

9. A method according to claim 7, wherein said steps of securing one end of said elongated member to a gripping member and radially constraining at least one end of said elongated member with respect to said longitudinal axis at two positions axially spaced apart are performed on the same end of said elongated member.

10. A method according to claim 7, further comprising the step of radially constraining each end of said elongated member with respect to said longitudinal axis at two positions axially spaced apart.

11. A method for the chemical deposition of synthetic material on an elongated substrate member having a longitudinal axis, comprising the steps:
  a) securing one end of said elongated member in a gripping member;
  b) imparting rotation about said longitudinal axis to said elongated member through said gripping member;
  c) depositing synthetic material on said elongated member; and
  d) applying a first contact force with a first member to a first position on said elongated member and applying a second contact force with a second member to a second position on said elongated member, the first position and the second position being spaced apart along said longitudinal axis and located substantially at one end of said elongated member, and the first member and the second member each having a proximal end and a distal end with respect to the at least one end of said elongated member, the distal end of the first member being adjacent to the proximal end of the second member.

12. A method according to claim 11, wherein said steps of securing one end of said elongated member to a gripping member and applying the first and second contact forces to the one end of said elongated member are performed on opposite ends of said elongated member.

13. A method according to claim 11, wherein said steps of securing one end of said elongated member to a gripping member and applying the first and second contact forces to the one end of said elongated member are performed on the same end of said elongated member.

14. A method according to claim 11, further comprising the step of radially constraining each end of said elongated member with respect to said longitudinal axis at two positions axially spaced apart.

* * * * *